Patented Oct. 19, 1943

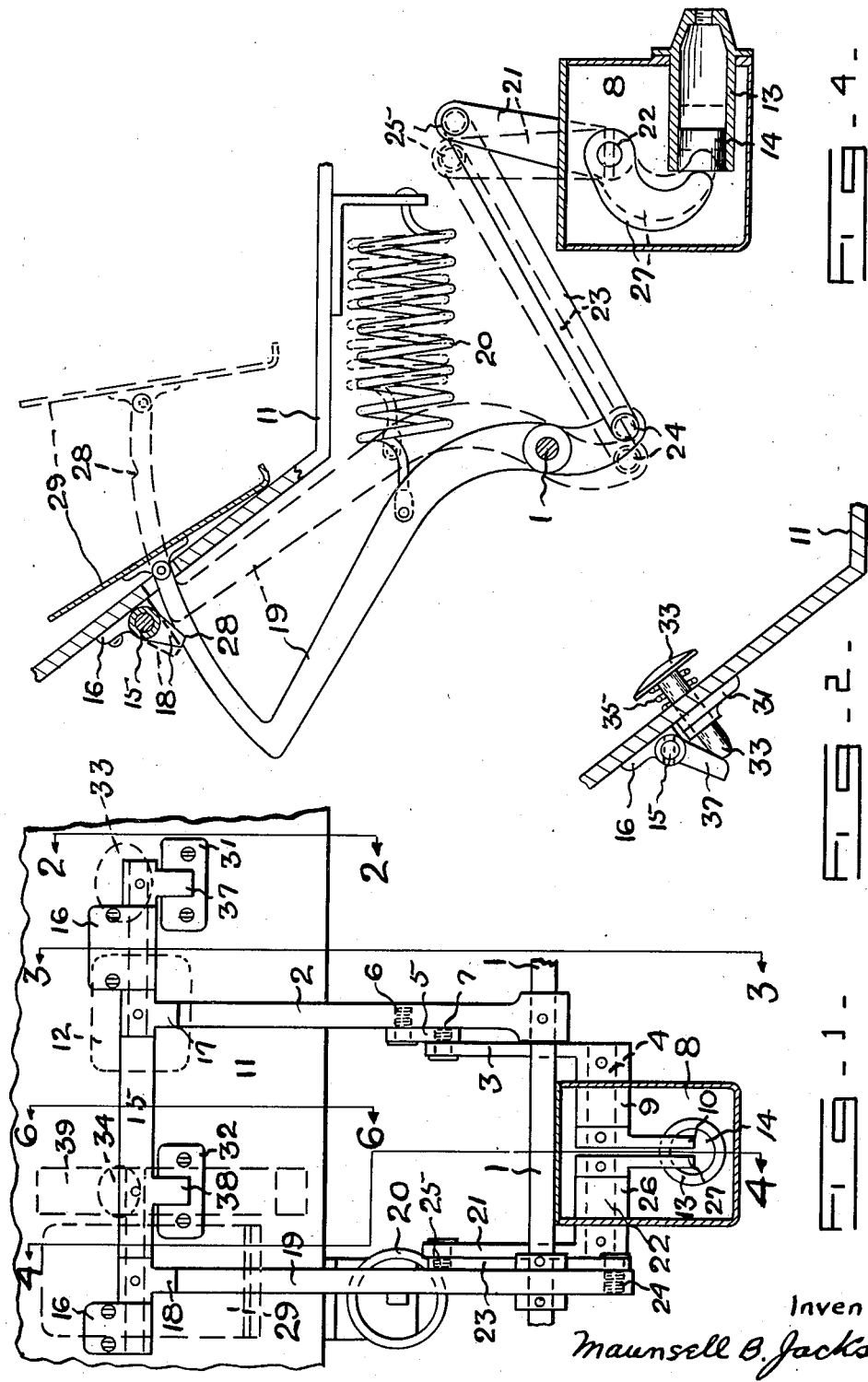

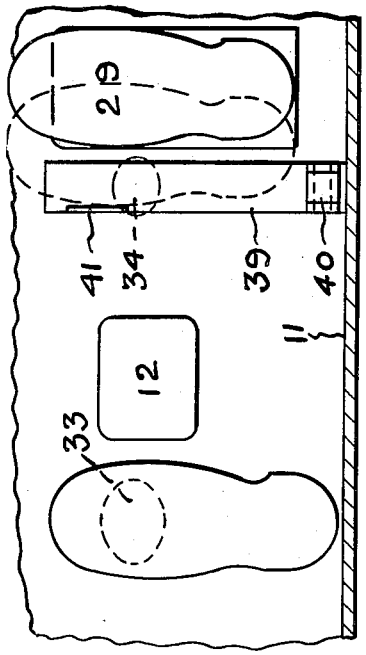
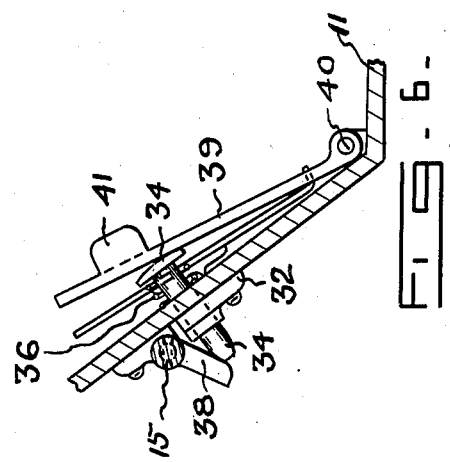
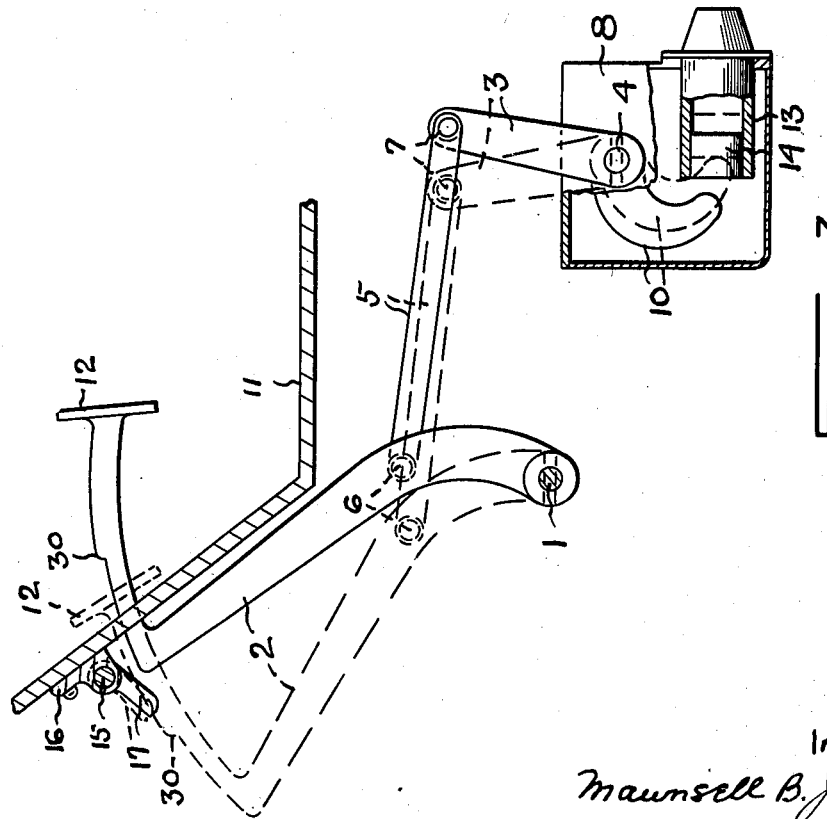

2,332,228

UNITED STATES PATENT OFFICE 2,332,228

MOTOR BRAKE CONTROL

Maunsell B. Jackson, Toronto, Ontario, Canada

Application March 10, 1941, Serial No. 382,532

5 Claims. (Cl. 192—13)

This invention relates to control mechanism for brakes such as are used on motor cars, and the object of the invention is to provide a simple and inexpensive control mechanism that will make the operation of motor cars, especially at high speeds, easier and safer.

I attain the above mentioned object by mechanism illustrated by way of example in the accompanying drawings in which:

Fig. 1 is a view of the mechanism installed in a motor car in elevation and partial section, the point of view being in front of and under the floor boards, Fig. 2 a sectional view on the line 2—2 in Fig. 1, Fig. 3 a sectional view on the line 3—3 in Fig. 1, partly broken away to show the plunger 14, Fig. 4 a sectional view on the line 4—4 in Fig. 1, Fig. 5 a view of the floor boards of the motor car showing the arrangement of the foot pedals, the point of view being behind and above the floor boards, and Fig. 6 a sectional view on the line 6—6 in Fig. 1.

Like numerals of reference indicate corresponding parts in the different figures.

The numeral 1 indicates a shaft, being a part in the construction of most motor cars, on which a brake pedal is customarily hinged and to which a clutch pedal is customarily fastened.

2 is a clutch pedal rigidly fastened to the shaft 1 and constrained to rock therewith.

3 is a lever for operating hydraulic brakes (not shown).

4 is a shaft to which the lever 3 is rigidly attached.

5 is a tie rod rockably pinned to the clutch pedal 2 at 6 and to the lever 3 at 7.

8 is a receptacle for containing fluid required for the operation of the hydraulic brakes.

9 is a boss on the receptacle 8 and in which the shaft 4 is rockably carried.

10 is a lever rigidly attached to the shaft 4 at the end remote from the lever 3.

11 are the floor boards of a motor car (not shown).

12 is a foot plate rigidly attached to the pedal 2.

13 is a cylinder rigidly attached to the receptacle 8.

14 is a piston slidable in the cylinder 13 and adapted to be contacted by the free end of the lever 10.

15 is a shaft held to the floor boards 11 by the bearing clips 16, 16 in which the shaft 15 is free to rock.

17 is a trigger rigidly attached to the shaft 15 and constrained to rock therewith.

18 is a pawl rigidly attached to the shaft 15 and constrained to rock therewith.

19 is a service brake pedal free to rock on the shaft 1.

20 is a spring attached to the pedal 19 and to the floor boards 11 whereby there is a constant pull tending to rotate the pedal 19 in a clockwise direction about the shaft 1.

21 is a lever for operating the hydraulic brakes.

22 is a shaft to which the lever 21 is rigidly attached.

23 is a tie rod rockably pinned to the service brake pedal 19 at 24 and to the lever 21 at 25.

26 is a boss on the receptacle 8 and in which the shaft 22 is rockably carried.

27 is a lever attached to the shaft 22 at the end remote from the lever 21.

28 is a notch formed in the service brake pedal 19 and adapted to be engaged by the pawl 18.

29 is a foot plate hinged on the pedal 19.

30 is a projection or cam formed on the clutch pedal 2.

31 and 32 are bearings fastened to the floor boards 11 by screws as shown and in which are slidably mounted the plungers 33 and 34.

35 and 36 are springs tending to hold the plungers 33 and 34 in their inoperative positions.

37 and 38 are triggers rigidly attached to the shaft 15 and constrained to rock therewith.

39 is a foot plate hinged to the floor boards 11 at 40 and adapted when pressed down by the foot of a driver to depress the plunger 34.

41 is a projection or guard formed on the foot plate 39.

The operation is as follows:

Assuming the mechanism is positioned as shown by the full lines in the drawings, it will be noted that the clutch pedal 2 extends upwardly through the floor boards as far as it will go, and the service brake pedal 19 is down through the floor boards until the notch 28 is positioned for engagement by the pawl 18. The spring 20 is thus held from applying the brake.

This is the normal driving position of the mechanism and in this position there will be no pressure in the braking system since there will be no force on the piston 14 to move it to the right in the cylinder 13.

The driver normally sits with his feet positioned in the same driving position with my system as with the conventional push brake system, that is he sits with his right foot on a hinged foot plate 29 and his left foot resting at east just to the left of the clutch pedal 12. These positions are shown in full lines in Fig. 5, the left foot being preferably over the plunger 33.

When the driver with his feet in these positions desires to slow down gradually, he presses with his left foot on the plunger 33 to depress it and cause the trigger 37 to rotate clockwise. The shaft 15 and the pawl 18 are thus turned until the engaging end of the pawl is withdrawn from the notch 28. The service brake pedal 19 will now be actuated by the spring 20 to apply the brakes. Since the right foot of the driver is resting on the foot plate 29, the upward movement of the brake pedal 19 by the spring 20 is controlled by the driver so that the brakes may be applied as gently as desired.

If it be desired to bring the car to a full stop suddenly the right foot will be entirely removed from the pedal 19 and the parts of the mechanism will quickly move to the brake applying positions shown by the dotted lines in Fig. 4.

The depressing of the left toe and the simultaneous lifting of the right foot are convenient and normal where transition from continuous direct driving to slowing down is required, and the positions of the driver's feet thus far described are those positions convenient and normal to such continuous direct driving. There are however other cases in which the driver's feet are not so positioned, the left foot being necessarily on the clutch pedal instead of at rest beside it. One such case is that of coasting with the clutch out, another gear changing and manoeuvring in traffic. These cases demand different braking motions from that already described, as it would not only be a matter of difficulty but of danger for a driver driving with his clutch held out to be required to first let his clutch in and then reach for a plunger and depress it to attain braking.

In such cases to stop a car equipped with my system of brake control the driver may do either of two things, both entailing actions exactly in line with those motions he would have to make if he were driving a car equipped with the push brake system. The first of these said motions necessary to stop a car equipped with a push brake system is the raising the right foot from the hinged pedal (accelerator pedal) on which it is resting, moving the foot to the left and pressing down on the brake pedal which such movement to the left brings under his foot; and the second the pushing down of the left foot on the clutch pedal to prevent stalling the engine.

These same motions, or either of them, made by a driver of a car equipped with my system of brake control will cause braking. For example the pushing down of the left foot on the clutch pedal 2 will cause the projection or cam 30 thereon (see Fig. 3) to contact the trigger 17 rocking it, the shaft 15, and the pawl 18, clockwise to free the brake pedal 19 and allow it to rise under the restraint of the driver's foot, when as hereinbefore explained braking will be attained in proportion to the removal of the restraint.

This is the normal way of applying my brakes when the left foot is not available to depress the plunger 33, but the raising of the right foot, moving it to the left, and pressing on the foot plate 39, will cause the plunger 34 to perform the same function as the cam 30.

In either case the brake pedal 19 will rise under the driver's foot giving him perfect flexible brake control.

It should be noted that the motion of the driver's right foot to the left is limited by the guard 41, which while shown integral with the foot plate 39 is not necessarily so, and that the position of the guard is such that when it is contacted by the driver's foot the said foot overlies the foot plate 39 and also part of the hinged plate 29. Thus, the lever 19 when the pawl 18 is disengaged therefrom moves upwardly to apply the brake, the hinged plate 29 will contact the portion of the driver's foot overlying said plate 29 so that the intensity of the brake application may be varied.

What I claim is:

1. A brake controlling mechanism comprising a brake pedal; means tending to move the pedal to apply the brake; a pawl for releasably engaging the pedal to hold it in its brake releasing position; a clutch pedal having a projection; a trigger connected with the pawl for engagement by the projection upon movement of the clutch pedal to cause the pawl to release the brake pedal so that the first mentioned means is permitted to apply the brake; and a plate on the brake pedal, normally engaged by the foot of an operator so that the movement of the brake pedal by the brake applying means is controlled by the operator.

2. A brake controlling mechanism comprising a brake pedal; means tending to move the pedal to apply the brake; means for releasably holding the pedal in its brake releasing position; a clutch pedal; a foot engaging plate; means operable by one of said clutch pedal and said foot plate for actuating the holding means to permit the first mentioned means to apply the brake; and a plate on the brake pedal normally engaged by the foot of an operator, the said plates being positioned side by side so that the operator's foot may engage the first mentioned plate while still overlying the second mentioned plate whereby the movement of the brake pedal by the brake applying means is controlled by the operator.

3. A brake controlling mechanism comprising a brake pedal; means tending to move the pedal to apply the brake; a rotatable shaft; a pawl secured to said shaft for engaging the brake pedal to releasably hold it in its brake releasing position; manually operable means for turning the shaft to disengage the pawl from the brake pedal to permit the first mentioned means to apply the brake; and a plate, carried by and movable relative to the brake pedal without moving said brake applying means, said pawl and said means for disengaging the pawl, the plate being normally engaged by the foot of an operator so that the movement of the brake pedal by the brake applying means is controlled by the operator.

4. A brake controlling mechanism comprising a brake pedal; means tending to move the pedal to apply the brake; a rotatable shaft; a pawl secured to said shaft for engaging the brake pedal to releasably hold it in its brake releasing position; a trigger secured to said shaft; a clutch pedal having provisions for engaging said trigger to cause the shaft to be turned and thus the pawl to be disengaged from the brake pedal when the clutch pedal is depressed; and a plate, carried by and movable relative to the brake pedal, normally engaged by the foot of an operator so that the movement of the brake pedal by the brake applying means is controlled by the operator.

5. A brake controlling mechanism comprising a brake pedal; means tending to move the pedal to apply the brake; a rotatable shaft; a pawl secured to said shaft for engaging the brake pedal to releasably hold it in its brake releasing position; a plurality of triggers secured to said shaft in spaced relationship to one another; a clutch pedal having provisions for engaging one of said triggers to cause the pawl to be disengaged from the brake pedal when the clutch pedal is depressed; manually operable members for engaging said other triggers to cause the shaft to be turned and the pawl to be disengaged from the brake pedal upon the operation of any one of said other members; and a plate, carried by and movable relative to the brake pedal, normally engaged by the foot of an operator so that the movement of the brake pedal by the brake applying means is controlled by the operator.

MAUNSELL B. JACKSON.